United States Patent [19]

St. John

[11] 4,254,854
[45] Mar. 10, 1981

[54] CENTRIFUGAL CLUTCH SHOE MOUNTING ARRANGEMENT

[75] Inventor: Richard C. St. John, North Canton, Ohio

[73] Assignee: Dyneer Corporation, Canton, Ohio

[21] Appl. No.: 1,597

[22] Filed: Jan. 8, 1979

[51] Int. Cl.³ .............................................. F16D 43/24
[52] U.S. Cl. ............................ 192/105 CD; 188/184; 192/105 CE
[58] Field of Search ................ 192/105 CD, 105 CE; 188/184

[56] References Cited

U.S. PATENT DOCUMENTS

| 2,275,046 | 3/1942 | Harris | 192/105 CD |
|---|---|---|---|
| 2,375,909 | 5/1945 | Fawick | 192/105 |
| 2,534,426 | 12/1950 | Eason | 192/105 |
| 2,626,034 | 1/1953 | Fawick | 192/105 |
| 2,782,893 | 2/1957 | Chapman | 192/76 |
| 2,823,779 | 2/1958 | Johnson et al. | 192/105 CD |
| 3,024,886 | 3/1962 | Peras | 192/105 CE |
| 3,208,571 | 9/1965 | Bochory | 192/105 CD |
| 3,908,475 | 9/1975 | Takagi et al. | 74/230.17 E |
| 4,106,605 | 8/1978 | Winchell | 192/105 CD |

*Primary Examiner*—C. J. Husar
*Assistant Examiner*—Conrad Berman

*Attorney, Agent, or Firm*—Frease & Bishop

[57] ABSTRACT

A clutch construction has an improved arrangement for pivotally mounting a pair of centrifugally actuated clutch shoes on the drive rotor assembly of the clutch. A backing plate and drive flange are mounted in a spaced axial relationship with respect to each other on a hub of the rotor assembly for rotation with the hub which is adapted to be mounted on a drive shaft of a prime mover. A clutch housing is rotatably mounted on the hub by a bearing ring and is driven by the clutch shoes upon a predetermined shaft speed being reached. A pair of openings are formed in the backing plate located diametrically opposite of each other and are axially aligned with a pair of similar openings formed in the drive flange. A resilient bushing is telescopically mounted in each of the backing plate and drive flange openings to provide a shock-absorbing effect between the clutch shoes pivot pins and the drive flange to prevent fracture of the drive flange. A pivot pin is telescopically mounted in each of the pairs of resilient bushings of the axially aligned backing plate and drive flange openings and projects through an opening formed in each of the clutch shoes for pivotally mounting the clutch shoe between the plate and flange.

10 Claims, 4 Drawing Figures

CENTRIFUGAL CLUTCH SHOE MOUNTING ARRANGEMENT

BACKGROUND OF THE INVENTION

1. Field of the Invention

The invention relates to clutches and particularly to clutches which are operated automatically by centrifugal force at a predetermined speed of rotation so as to connect an inner drive rotor assembly to an outer driven member or load. More particularly, the invention relates to an improved mounting arrangement for the centrifugally actuated clutch shoes which absorb the forces heretofore exerted directly on the mounting components, and in addition provide a smooth, low-friction sliding surface between the pivot pin and its mounting components.

2. Description of the Prior Art

There are numerous types and arrangements of centrifugal clutch constructions in which one or more clutch shoes are retained in retracted position by springs until sufficient centrifugal force acts on the shoes to overcome the force of the retaining springs, whereupon the clutch shoes pivot and swing outwardly and engage a stationary clutch housing or drum.

Some of these clutch constructions have a pair of arcuate-shaped clutch shoes which are pivotally mounted in an end-to-end relationship with respect to each other by a pair of pivot pins on a backing plate member. The backing plate, in turn, is fixed to a drive shaft or hub for rotation with the drive shaft.

These pivot pins use a simple beam-type mounting arrangement for the clutch shoes, wherein the pivot pin is supported on both ends by the backing plate and an axially spaced drive flange. The pivot pins extend through axially aligned openings formed in the backing plate and drive flange, and through openings formed in the clutch shoes for pivotally mounting the shoe between the backing plate and drive flange.

Problems have occurred in these types of constructions in that considerable forces are exerted directly on the shoes upon the shoes couplingly engaging the driven member. These forces are transmitted through the pivot pins to the backing plate and drive flange. Occasionally, the drive flange will develop cracks or fractures in the metal which surrounds and defines the pivot pin receiving openings. These flanges preferably have as minimal an amount of metal as possible at their outer ends in which the pivot pin openings are formed in order to reduce the weight of the clutch. Either the flange thickness or the amount of flange metal surrounding the pivot pin receiving openings must be increased to prevent this fracturing, thereby undesirably increasing the weight of the clutch. The main problem occurring with these prior constructions is wear. Notches and grooves are worn in the pin, shoe and/or mounting flange, resulting in improper operation or non-function because of resulting clearance problems.

Some clutch constructions use a shock-absorbing bushing that is telescopically mounted on and extends throughout the length of the pivot pin to eliminate this fracturing problem. However, this bushing requires a greater diameter opening to be formed in the clutch shoe through which the pivot pin and surrounding shock-absorbing bushing extend, thereby requiring additional metal and weight in the clutch shoe than would be required if the resilient bushing were not used.

There is no known centrifugal clutch construction of which I am aware which provides for pivotally mounting the clutch shoes on a simple beam-type pivot pin mounting arrangement in which the ends of each pivot pin are telescopically mounted in shock-absorbing bushings which, in turn, are telescopically mounted in openings formed in an axially spaced backing plate and drive flange, and in which the clutch shoe is mounted directly on the pivot pin without any intervening bushing material, thereby reducing the size of the pivot pin receiving opening formed in the clutch shoe.

SUMMARY OF THE INVENTION

Objectives of the invention include providing an improved centrifugal clutch shoe mounting arrangement in which each of the clutch shoes is pivotally mounted on a metallic pivot pin which is supported by a simple beam-type arrangement with the pin ends being attached to a backing plate and an axially spaced drive flange which provides an extremely rigid and strong type of clutch shoe pivot support as is used in many clutch constructions; providing such an improved mounting arrangement in which the pivot pins are isolated from the metal of their supporting backing plate and drive flange by resilient annular bushings formed of an elastomer or high strength plastic material which provides a smooth, low-friction sliding surface for the pivotal movement of the various components, and in particular, the bushing provides a layer of shock-absorbing material between the pin and its supporting members to eliminate wear and fracture of the metal areas which define the pivot pin receiving openings, especially the metal of the drive flange which heretofore has been susceptible to wear and breakage, thereby eliminating the need of increasing the thickness of the drive flange metal or the area of metal of the drive flange which surrounds and defines the pivot pin receiving opening while maintaining both the weight and the cost of the clutch as low as possible without sacrificing efficiency and durability; providing such a mounting arrangement in which the pivot pin extends through an opening formed in the clutch shoe with the pin being in direct contact with, and preferably attached to, the clutch shoe, eliminating the need for an intervening shock-absorbing bushing as in prior constructions, thereby enabling the diameter of the clutch shoe pivot pin receiving opening to be as small as possible, again resulting in less metal being required to surround and define the clutch shoe pivot pin opening; and providing such an improved clutch shoe mounting arrangement which is of an extremely simple and inexpensive construction, extremely durable and efficient in operation and use, and which solves problems and eliminates difficulties heretofore encountered with other known clutch constructions, which achieves the objectives indicated, and which satisfies needs existing in the art.

These objectives and advantages are obtained by the improved clutch shoe mounting arrangement for a centrifugal clutch construction of the type having an outer driven member adapted to be couplingly engaged by an inner drive rotor assembly, in which the rotor assembly has a backing plate and an axially spaced flange which are mounted on a hub of the rotor assembly for rotation with said hub, in which a pair of clutch shoes are pivotally mounted between the backing plate and spaced flange by a pair of pivot pins which extend between and through axially aligned openings formed in the back plate, spaced flange and clutch shoes, wherein the improvement includes: bushing means formed with a central bore seated in each of the backing plate and flange openings, with the pivot pins being telescopically mounted within said bushing means bores; and the pivot pins extending through the clutch shoe openings and in direct contact with the clutch shoes.

BRIEF DESCRIPTION OF THE DRAWING

A preferred embodiment of the invention—illustrative of the best mode in which applicant has contemplated applying the principle—is set forth in the following description and shown in the accompanying drawing, and is particularly and distinctly pointed out and set forth in the appended claims.

Similar numerals refer to similar parts throughout the drawings.

DESCRIPTION OF THE PREFERRED EMBODIMENT

Figure 1:
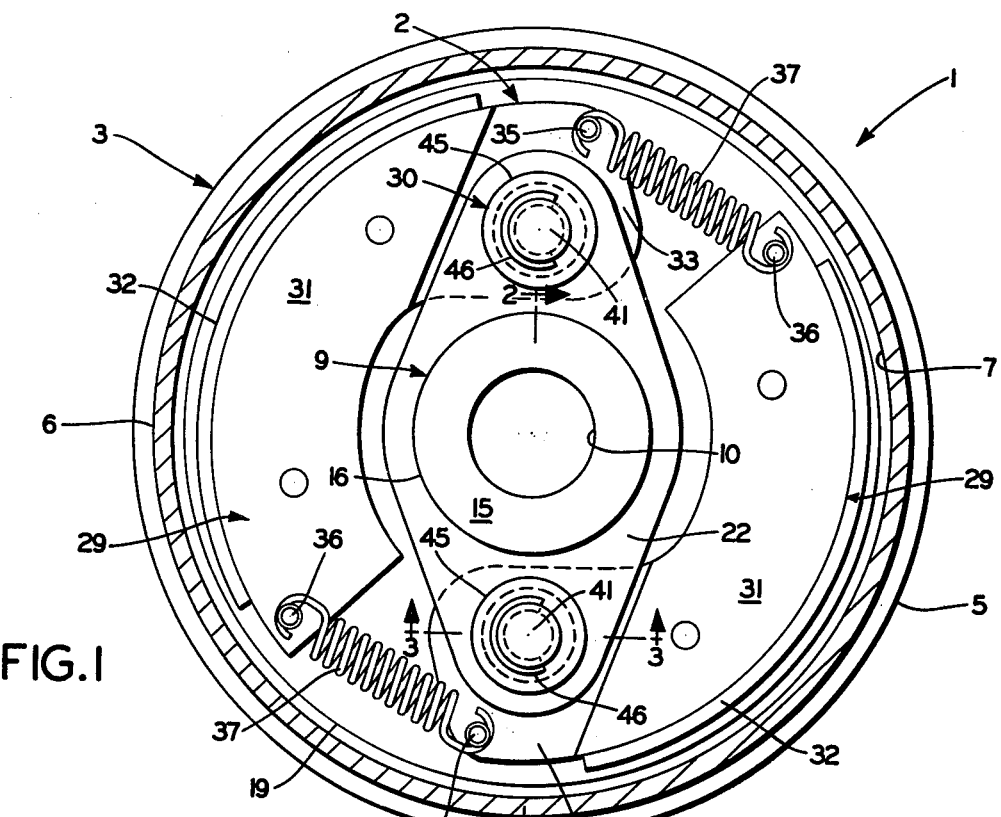
FIG. 1 is a front elevational view of a centrifugal clutch construction having the improved clutch shoe mounting arrangement incorporated therein with a surrounding clutch housing shown in section.

FIG. 1 illustrates a centrifugal clutch construction indicated generally at 1, having the improved clutch shoe mounting arrangement incorporated therein. Clutch 1 includes an inner rotor assembly, indicated generally at 2, and an outer driven clutch member or housing 3. Clutch 1 is shown in a disengaged position with housing 3 in FIGS. 1 and 2.

Housing 3 is shown as an integral pulley clutch housing having a multi-V-grooved pulley end formation 5 which is connected to a cylindrical housing drum wall 6. The inner surface 7 of drum wall 6 provides the coupling surface for drivingly connecting clutch housing 3 with rotor assembly 2. Housing 3 may have various configurations and arrangements and may be adapted to be operatively engaged with mechanisms other than a multi-V-grooved pulley belt without departing from the concept of the invention.

Figure 2:
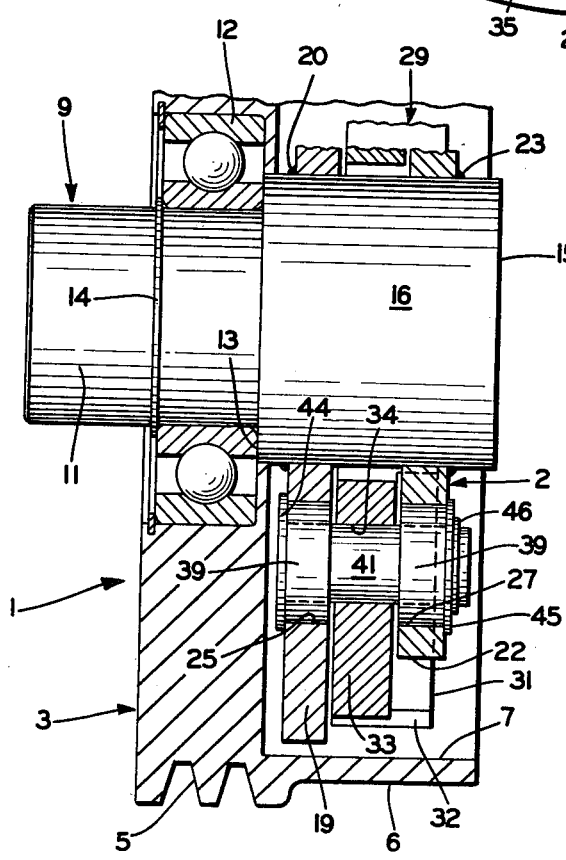
FIG. 2 is an enlarged fragmentary sectional view taken on line 2—2, FIG. 1, with the hub being shown in elevation.

Rotor assembly 2 includes a hub 9 which is adapted to be mounted on and secured to a drive shaft (not shown) so as to rotate with the drive shaft. Hub 9 has a smooth cylindrical bore 10 in which the drive shaft is adapted to be telescopically mounted. Hub 9 further includes a reduced end 11 which is provided with a cylindrical outer surface on which driven clutch housing 3 is rotatably mounted by a bearing ring 12 (FIG. 2). Bearing ring 12 is located between an annular shoulder 13 formed on hub 9 and a snap ring 14 which maintains bearing ring 12 in position against shoulder 13.

The other end 15 of hub 9 is provided with a cylindrical surface 16 having a larger diameter than that of hub end 11. A circular backing plate 19 is mounted on rotor hub end 15 and is secured thereon by circular welds or brazed areas 20. Backing plate 19 extends radially from hub 9 and may be formed by stamping or casing or may be formed integrally with hub 9. The diameter and thickness of plate 19 may vary depending upon the particular clutch construction and intended application of the clutch. A drive flange 22 having a somewhat elongated oval-shaped configuration, as shown in FIG. 1, is mounted on hub end 15 spaced axially from backing plate 19. Flange 22 also may be mounted on hub 9 by circular welds or brazed areas 23 or formed integrally therewith as is backing plate 19. Likewise, backing plate 19 and drive flange 22 may have other configurations than those shown in the drawing and described above without affecting the concept of the invention.

Backing plate 19 is formed with a pair of circular openings 25, located diametrically opposite with respect to each other. Openings 25 are in axial alignment with a pair of complementary-shaped circular openings 27 formed diametrically opposite of each other in drive flange 22 (FIGS. 2 and 3).

In accordance with the invention, a pair of arcuate-shaped clutch shoes, indicated generally at 29, are pivotally mounted on and located between backing plate 19 and drive flange 22 by the improved clutch shoe mounting arrangement, indicated generally at 30. Clutch shoes 29 may be of a usual construction and configuration and are arranged in an end-to-end relationship with respect to each other, as shown in FIG. 1. Each clutch shoe 29 includes a web 31 with a strip of friction material 32 mounted on the outer peripheral edge thereof by an adhesive or other means. Each shoe web 31 is formed with a reduced thickness end portion 33 formed with a circular opening 34 therein.

A pair of spring pins 35 and 36 are mounted on the opposite ends of each shoe web with a pair of extension springs 37 extending therebetween to bias the swinging ends of the clutch shoes toward retracted position.

Figure 4:
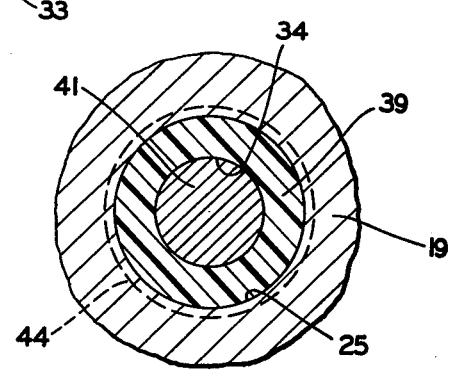
FIG. 4 is a fragmentary sectional view taken on line 4—4, FIG. 3.
Figure 3:
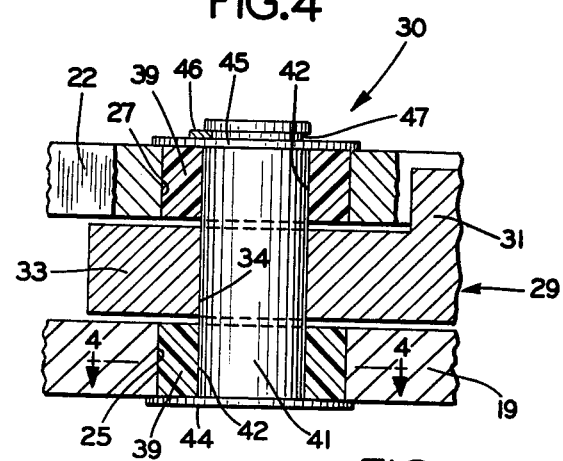
FIG. 3 is an enlarged fragmentary sectional view taken on line 3—3, FIG. 1 showing the improved clutch shoe mounting arrangement.

The improved clutch shoe mounting arrangements 30 are shown particularly in FIGS. 3 and 4. Each arrangement 30 includes a resilient bushing 39 mounted in backing plate opening 25 and in drive flange opening 27. Bushings 39 are formed of an elastomer or a high-strength engineering type plastic which has relatively high compression and tensile characteristics and minimum cold flow. This plastic may be a diallyphthalate, polycarbonate, polysulfone or similar material without affecting the concept of the invention. Also, bushings 39 could be formed of a powdered metal material which has some degree of resilience and shock-absorbing features, although the preferred construction of bushings 39 would be of an elastomer or plastic material.

A metallic pivot pin 41 is telescopically mounted in and extends through an aligned central bore 42 formed in each bushing 39 and through clutch shoe opening 34. Pivot pin 41 is formed with an enlarged annular head 44 at one end and has a washer 45 mounted on the opposite end by a lock ring 46 which is seated within a groove 47 formed in pin 41 (FIG. 3). Preferably, the diameter of pin head 41 and washer 45 will be greater than the diameter of bushing 39 so as to be in clamping engagement with the surrounding metal of backing plate 19 and drive flange 22 which defines circular openings 25 and 27.

In the preferred embodiment, pivot pin 41 is fixed to shoe web portion 33 by a force fit or other attaching means, with bushings 39 also being attached to pin 41 so as to rotate within openings 25 and 27 upon pivotal movement of the clutch shoe 29 and pin 41. Alternately, clutch shoe 29 may be fixed to pin 41 with bushings 39 being fixed with respect to backing plate 19 and drive flange 22. With this arrangement, pin 41 will slidably rotate within bushing bores 42 upon pivotal movement of the clutch shoes. The material of bushings 39 also will provide a relatively low friction sliding surface between the rotating components of the improved pivotal mounting arrangement.

In either of these two arrangements or embodiments, the metallic pivot pin and attached clutch shoe is isolated from direct metal-to-metal contact with the supporting backing plate and drive flange by shock-absorbing bushings 39. Thus, the various forces which are exerted on the clutch shoes and pivot pins during coupling engagement with clutch housing 3 are not transmitted directly to the metal areas which surround pin receiving openings 25 and 27 of backing plate 19 and drive flange 22. These forces are sufficiently absorbed by the intervening bushings to considerably reduce the wear and fracturing of the surrounding metal, especially of drive flange 22 which has been susceptible to excessive wear and failure in prior constructions.

The operation of clutch construction 1 is similar to those of other centrifugally actuated clutch constructions in which shoes 29 attempt to move radially outwardly from their retracted positions under the influence of centrifugal force as the rotational speed of the drive shaft increases, until sufficient centrifugal force is exerted on the shoes to overcome the resistance of springs 37. Upon reaching this engagement speed, friction material 32 drivingly engages drum wall 7 to couplingly engage housing 3 with rotor assembly 2 to operatively drive a pulley belt (not shown) extending about and fitted within the pulley V-grooves formed in end formation 5.

Clutch shoes 29 will maintain their driving engagement with drum wall 6 until the speed of the drive shaft decreases to a predetermined level, whereupon the centrifugal force exerted on the shoes is overcome by the biasing force of springs 37 and the shoes return to their retracted position of FIGS. 1 and 2.

Improved clutch shoe mounting arrangement 30 has a number of advantages not believed present in known clutch shoe pivot assemblies. The resilient, shock-absorbing bushings permit the simple beam-type pivot pin mounting arrangement to be maintained in the clutch which provides an extremely efficient and proven assembly for mounting of the clutch shoes, without increasing the thickness of the metal in the drive flange and backing plate while minimizing the heretofore wear and fracturing problem of the drive flange metal which surrounds and defines the pivot pin receiving opening. Another advantage of the improved mounting assembly is the mounting of the pivot pin directly to the metal of the clutch shoe web without any intervening shock-absorbing material being required as in prior constructions, thereby enabling a minimum diameter pivot pin receiving opening to be formed in the clutch shoe web, which again requires less metal in the clutch shoe for forming the opening and for providing the required strength and primarily the improved wear characteristics thereto. Bushings 39 provide smooth, low-friction sliding surface areas for the pivotal movement of the clutch shoes with respect to the backing plate and drive flange, as well as a shock-absorbing effect and improved wear resistance against the forces encountered by the clutch shoes which heretofore was transmitted directly to the pivot pin mounting members.

Accordingly, the improved centrifugal clutch shoe mounting arrangement provides a construction which is simplified, effective, safe, inexpensive and efficient, which achieves all of the enumerated objectives, provides for eliminating difficulties heretofore encountered with prior clutch constructions, and which solves problems and obtains new results in the art.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details of the construction shown or described.

Having now described the features, discoveries and principles of the invention, the manner in which the improved centrifugal clutch shoe mounting arrangement is constructed, assembled and operated, the characteristics of the new construction, and the advantageous, new and useful results obtained; the new and useful structures, devices, elements, arrangements, parts, and combinations are set forth in the appended claims.

I claim:

1. An improved clutch shoe mounting arrangement for a centrifugal clutch construction of the type having an outer driven member adapted to be couplingly engaged by an inner drive rotor assembly, in which the rotor assembly has a backing plate and an axially spaced flange which are mounted on a hub of the rotor assembly for rotation with said hub, in which a pair of clutch shoes are pivotally mounted between the backing plate and spaced flange by a pair of pivot pins which extend between and through axially aligned openings formed in the backing plate, spaced flange and clutch shoes, wherein the improvement includes: bushing means formed with a central bore seated in each of the backing plate and flange openings, with the pivot pins being telescopically mounted within said bushing means bores; and the pivot pins extending through the clutch shoe openings and in direct contact with the clutch shoes.

2. The mounting arrangement defined in claim 1 in which the bushing means have an annular configuration and are formed of an elastomer material.

3. The mounting arrangement defined in claim 1 in which the bushing means are fixedly mounted on the pivot pins so as to rotate with said pins; and in which the bushing means are rotatably mounted in and with respect to the backing plate and flange openings.

4. The mounting arrangement defined in claim 1 in which the bushing means are fixedly mounted in the backing plate and flange openings; and in which the pivot pins are rotatably mounted within the central bores of the bushing means.

5. The mounting arrangement defined in claim 1 in which the pivot pins are fixedly mounted to the clutch shoes so as to rotate with said shoes.

6. The mounting arrangement defined in claim 1 in which the pivot pins are slidably mounted within the clutch shoe openings.

7. The mounting arrangement defined in claim 1 in which the bushing means are formed of a powdered metal material.

8. The mounting arrangement defined in claim 1 in which the spaced flange has an oval-shaped configuration; and in which the bushing means receiving openings are formed diametrically opposite of each other.

9. The mounting arrangement defined in claim 1 in which the bushing means have an annular configuration and are formed of a plastic material.

10. The mounting arrangement defined in claim 9 in which the bushing means are formed of olysulfone.

* * * * *

UNITED STATES PATENT AND TRADEMARK OFFICE
CERTIFICATE OF CORRECTION

PATENT NO. : 4,254,854
DATED : March 10, 1981
INVENTOR(S) : Richard C. St. John

It is certified that error appears in the above-identified patent and that said Letters Patent are hereby corrected as shown below:

Column 6, Line 67, "olysulfone" should be - polysulfone"

Signed and Sealed this

Nineteenth Day of May 1981

[SEAL]

Attest:

RENE D. TEGTMEYER

Attesting Officer    Acting Commissioner of Patents and Trademarks